INVENTOR
CARLOS ROMANILLOS LOPEZ
BY *Stephen H. Frishauf*
ATTORNEY

July 7, 1970  C. R. LOPEZ  3,519,933
MULTIPLE PHASE ALTERNATING CURRENT METER
Filed Feb. 1, 1968  3 Sheets-Sheet 3
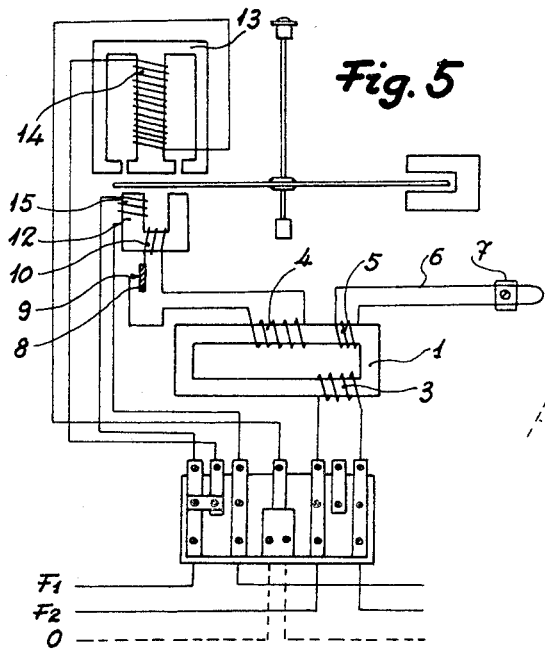
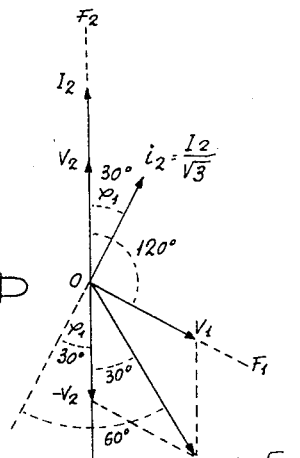
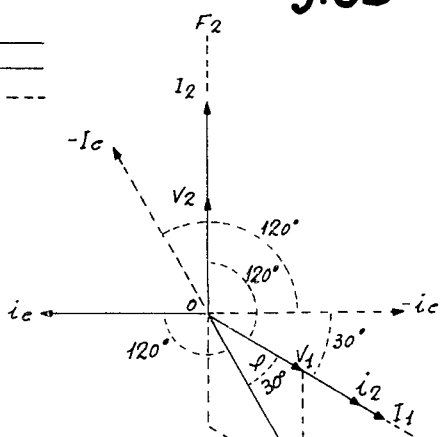
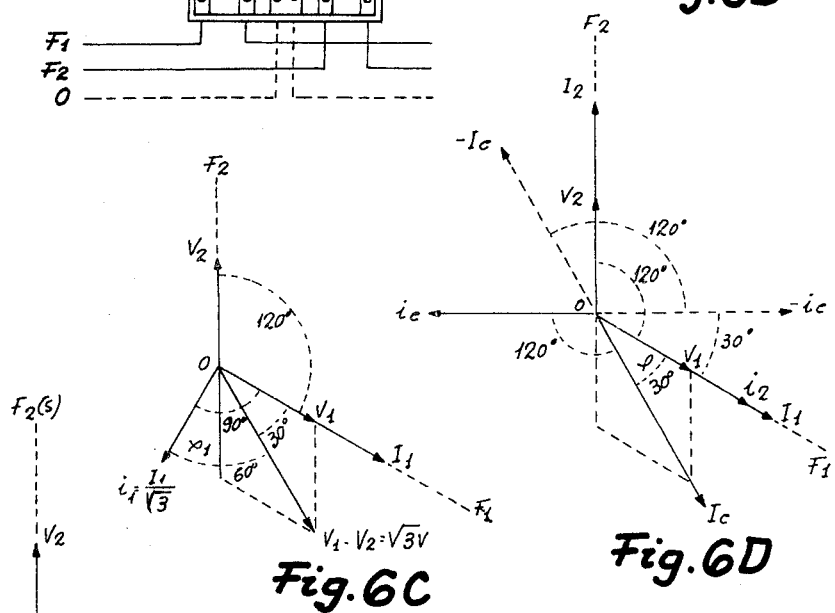
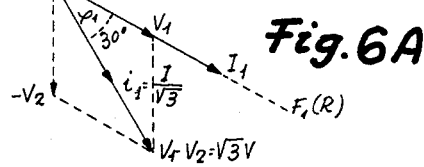

3,519,933
MULTIPLE PHASE ALTERNATING CURRENT METER
Carlos Romanillos Lopez, Glorieta de Guzman 1, Leon, Spain
Filed Feb. 1, 1968, Ser. No. 702,292
Claims priority, application Spain, Nov. 21, 1967, 347,436
Int. Cl. G01r 11/32
U.S. Cl. 324—107            8 Claims

ABSTRACT OF THE DISCLOSURE

An improved alternating-current electric meter for use with two phases and neutral (three-wires) wherein a single-phase (two-wire) meter having (a single coil in its consumption-current electro-magnet) is coupled to both phases and is further coupled to an ammeter induction equipment which produces a magnetizing current complementary to the consumption-current electro-magnet of the meter.

FIELD OF THE INVENTION

The invention pertains generally to the field of electrical measurements, and more particularly to the measurement of the power consumed between two phases, and between phases and neutral.

DESCRIPTION OF THE PRIOR ART

At the present time, for the measurement of electric current consumption between phases, and between phases and neutral, the double single-phase three-wire meter (two phases and neutral) is employed. This type of apparatus, as the name indicates, includes two single-phase devices in one and the same meter; that is to say, one single-phase device for each phase and for the neutral.

Such apparatus requires two voltage measuring equipments and two current-consumption electro-magnets, the consumption of the voltage equipments themselves, being much higher than that of a two-wire single phase element. In these meters the motor has to have two discs. The dimensions, weight and cost of such apparatus is approximately double those of the single-phase apparatus.

In view of the foregoing, it is the primary object of the present invention to provide a simplified double single-phase meter, to make possible the measurement of the power consumed between two phases, and between phases and neutral, with a single-phase meter which has installed in it an induction ammeter unit, which does not require any voltage whatsoever, in accordance with the description given below.

BRIEF DESCRIPTION OF THE DRAWINGS

FIG. 5 is a schematic representation of still another embodiment of the present invention; and FIGS. 6A–6D are vector diagrams of the voltages and currents appearing in the embodiments of the invention.

FIG. 1 is a schematic representation of the constitution and connection of the inductive ammeter equipment to a single-phase meter, with two phases, the latter being formed by a closed transformer core 1, FIG. 1, the form of construction of which is susceptible to variations. To the said core 1 there is fitted an ammeter coil 2 as the primary with a certain number of turns, placed in series with the phase $F_1$ and through which turns there flows the consumption-current of the said phase. On the same core 1 of the transformer there is another ammeter coil 3 acting as a primary, insulated from coil 2, fitted in series with the phase $F_2$, of an equal number of turns as 2 and through which the consumption-current of the phase 2 flows. The said core 1 has a low-voltage coil 4 as a secondary of the transformer, with a certain number of turns, and is connected in parallel with the auxiliary coil 10, which has the same number of turns as the consumption-current coil 11, and is situated in the electro-magnet 12 of the single-phase meter. Core 1 has another coil 5 insulated from 2, 3, and 4 connected in parallel with a resistance 6 which can be varied by means of the element 7. In series with the coil 10 and 4, is a resistance 8 which can be varied by means of a cursor 9. The coil of the primary 3 in series with the phase $F_2$ is, in turn, in series with the consumption-current coil 11 of the electro-magnet 12 of the single-phase meter. The voltage coil 14 of the single-phase meter with two phases is fitted on the core 13 and is connected to phases $F_1$ and $F_2$. The neutral of the line is not connected with the electric device of the meter.

FIG. 2, shows an upper view of a meter utilizing the induction ammeter equipment of this invention. FIG. 3 shows a front view of the apparatus with the induction equipment. In both figures the reference numbers of the elements correspond to those previously described with reference to FIG. 1.

FIG. 4, is a variation of the inductive ammeter equipment of this invention when the monophase meter with two phases has in the electro-magnet 12 two consumption-current coils 15 and 11, both in series with their respective phases $F_1$ and $F_2$. The ammeter induction equipment of FIG. 4 differs from that described in FIG. 1 only in that the primary coil 2 of the transformer 1 is in series with the phase $F_1$, and in turn in series with the ammeter coil 15 fitted on the electro-magnet of the single-phase meter. Likewise the consumption-current of phase $F_1$ flows through coil 15, the number of turns of this coil 15 being equal to that of the coil 11. Both these coils are situated in the electro-magnet 12 in such a manner that the magnetic fields created by the passage of the consumption-current between phases $F_1$ and $F_2$ are added. The auxiliary coil 10 of the ammeter induction equipment appears situated on the electro-magnet 12 in another position with respect to FIG. 1, but its electro-magnetic effects are the same, and it has half the number of turns of 11 or 15.

FIGS. 6A, 6B, 6C and 6D, represent the vectorial composition of the voltages and currents for the technical study of this invention.

FIG. 5, shows a second variant of the ammeter induction equipment applied to a single-phase meters which have their voltage measuring equipment connected between one phase and neutral. This embodiment is useful when the voltages between two phases and neutral are equal, that is, when $V_1=V_2$. In this case, the ammeter induction equipment 1 has one single coil 3 as the primary of consumption-current with a certain number of turns placed in series with phase $F_2$ and through which there flows the current of this phase; likewise, as a secondary, there is the auxiliary coil 10 situated on the electro-magnet 12 of the consumption-current equipment of the single-phase meter. In series with 4 and 10 is the regulation resistance 9 and 8 and the coil 5 is connected in parallel with resistance 6 which is adjustable by means of the element 7 for the adjustment of current and phase difference of the current induced in the secondary 4. The voltage equipment is formed by the core 13 and its coil 14 connected between the phase $F_2$ and neutral $0$. The number of turns of the primary ammeter coil 3 and of the secondary coil 14 is that necessary so that, on the consumption-current of phase $F_2$ flowing through the primary 3 there is a current induced in the coil 4 which, because of being in parallel with the auxiliary coil 10 has a value equal to that of the current which flows through the coil 3 of the primary, but 120° out of phase with the latter. The coil 15 of consumption of the phase $F_1$ of the meter, fitted on the electromagnet of the meter 12 has a number of turns equal to that of the auxiliary 10 of the induction ammeter equipment of this invention.

TECHNICAL STUDY OF THIS INVENTION AND OF ITS OPERATION

Figure 1:
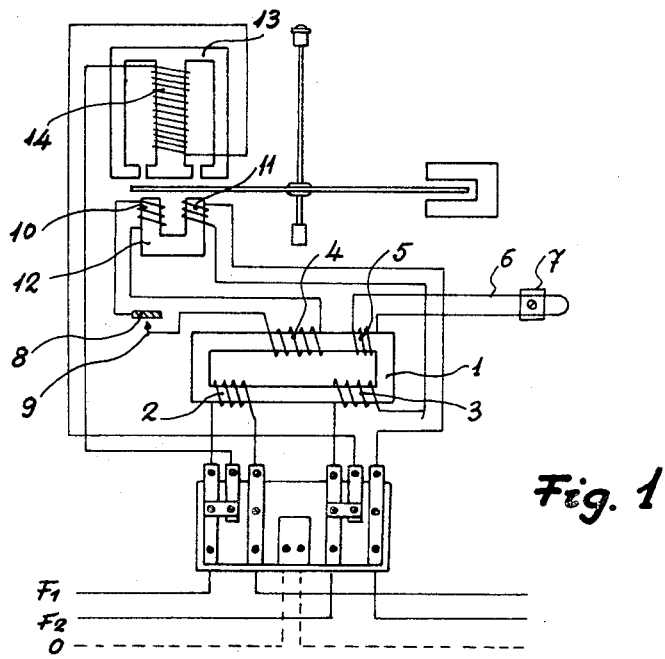
FIG. 1 is a schematic representation of an embodiment of the present invention.

The operation will now be described of the simplified double monophase meter when the induction ammeter equipment of this invention is connected to a single-phase meter which has its voltage equipment connected between two phases, and its electro-magnet equipment has only one ammeter coil in series with one phase (FIG. 1).

The current coils 2 and 3 which form the primary of the ammeter induction equipment, situated in the magnetic core 1 and both in series with their respective phases $F_1$ and $F_2$ have the same number of turns, and are situated magnetically in such a manner that when it comes to measuring the power consumed between the phases $F_1$ and $F_2$ on the current passing in the opposite direction through both coils, the magnetic field is null, and as a consequence, no low-voltage current whatsoever will be induced into the coil of the secondary 4. The single-phase meter then registers the consumption of the energy consumed by means of the current coil 11 of the electromagnet 12.

In what follows there is described the technical basis of this ammeter induction equipment when the consumption of energy is between the phase $F_1$ and neutral $0$ or, between the phase $F_2$ and neutral $0$.

First consider the situation when the energy consumption is between $F_1$ and $0$. In FIG. 6A, there are shown the vector values corresponding to the phases $F_1$ and $F_2$ 120° out of phase, and likewise the voltage values between phases and neutral, $V_1$ and $V_2$. This gives, as is known, the compound voltage $V_1-V_2=\sqrt{3}V$, 30° out of phase with $V_1$. Since $I_1$ for $\varphi=1$, the consumption-current will be in phase with $V_1$ but 30° out of phase with $\sqrt{3}V$.

Now, the current $I_1$ corresponding to the phase $F_1$, on flowing through the primary coil 2 of the ammeter induction equipment of this invention generates a magnetic field in the core 1 of the transformer producing in the coil of the secondary 4 which, because of being in parallel with the auxiliary coil 10 fitted on the electro-magnet 12 of the single-phase meter, a low-voltage induced current, which calculated by the number of turns, resistance and impedance is 30° out of phase with respect to the consumption-current $I_1$ of the phase $F_1$ and with the value $$i_1 = \frac{I_1}{\sqrt{3}}$$

In FIG. 6A. it is seen $i_1$ is in phase with the compound voltage $\sqrt{3}V$. This current $i_1$, on flowing through the auxiliary coil 10 fitted on the electro-magnet of the meter, and the coil 11 being inactive, the meter will register the following consumptions at different values of cos:

at cos 0°

$$\sqrt{3} \cdot V \cdot i_1 \cdot \cos 0° = \sqrt{3} \cdot V \cdot \frac{I_1}{\sqrt{3}} = V \cdot I_1$$

at cos 30°

$$\sqrt{3} \cdot V \cdot i_1 \cdot \cos 30° = \sqrt{3} \cdot V \cdot \frac{I_1}{\sqrt{3}} \cdot \tfrac{1}{2} = V \cdot I_1 \cdot 0.5$$

at cos 60°

$$\sqrt{3} \cdot V \cdot i_1 \cdot \cos 60° = \sqrt{3} \cdot V \cdot \frac{I_1}{\sqrt{3}} \cdot \frac{\sqrt{3}}{2} = V \cdot I_1 \cdot 0.86$$

at cos 90°

$$\sqrt{3} \cdot V \cdot i_1 \cdot \cos 90° = \sqrt{3} \cdot V \cdot \frac{I_1}{\sqrt{3}} \cdot 0 = 0$$

which correspond to the real consumption values.

The operation of the induction ammeter equipment when the current consumption is through the phase $F_2$ and the neutral $0$ will now be described. In FIG. 6B, there are likewise represented the vectors corresponding to the phases $F_1$ and $F_2$ out of phase by 120°. $I_2$ represents the consumption-current at cos $\varphi=1$ which circulates through phase $F_2$, flowing through the primary coil 3 of the ammeter induction equipment, and in turn the coil 11 of the electro-magnet 12 of the single-phase meter, while this current $I_2$ is in phase with $V_2$ on flowing through the primary coil 3, the current induced in the coil 4 of the secondary $i_2$ is 30° out of phase with $V_2$ and consequently is 60° out of phase with $\sqrt{3}V$. The electromagnetic effect of the consumption current $I_2$ in the coil 11 of the electro-magnet has been indicated to be $-I_2$. The meter will register the algebraic sum of the electromagnetic effect of the coil 11 and that of $i_2$ in the auxiliary coil 10 produced by the ammeter induction equipment.

Let us now see the energy consumptions that the meter will register at different values of cos at cos 0°

$$\sqrt{3} \cdot V \cdot I_2 \cdot \cos 30° - \sqrt{3} \cdot V \cdot i_2 \cdot \cos 60°$$
$$= \sqrt{3} \cdot V \cdot I_2 \cdot \frac{\sqrt{3}}{2} - \sqrt{3} \cdot V \cdot \frac{I_2}{\sqrt{3}} \cdot \tfrac{1}{2} = V \cdot I_2$$

at cos 30°

$$\sqrt{3} \cdot V \cdot I_2 \cdot \cos 60° - \sqrt{3} \cdot V \cdot i_2 \cdot \cos 90°$$
$$= \sqrt{3} \cdot V \cdot I_2 \cdot \tfrac{1}{2} - 0 = 0.86 \cdot V \cdot I_2$$

at cos 60°

$$\sqrt{3} \cdot V \cdot I_2 \cdot \cos 90° + \sqrt{3} \cdot V \cdot i_2 \cdot \cos 60°$$
$$= 0 + \sqrt{3} \cdot V \cdot \frac{I_2}{\sqrt{3}} \cdot \tfrac{1}{2} = 0.5 \cdot V \cdot I_2$$

at cos 90°

$$-\sqrt{3} \cdot U \cdot I_2 \cdot \cos 60° + \sqrt{3} \cdot V \cdot i_2 \cdot \cos 30°$$
$$= -\sqrt{3} \cdot U \cdot I_2 \cdot \tfrac{1}{2} + \sqrt{3} \cdot V \cdot \frac{I_2}{\sqrt{3}} \cdot \frac{\sqrt{3}}{2} = 0$$

When the current consumptions are at the same time between the phases $F_1$ and $F_2$ and neutral the meter will totalize the sum of these consumptions.

Figure 4:
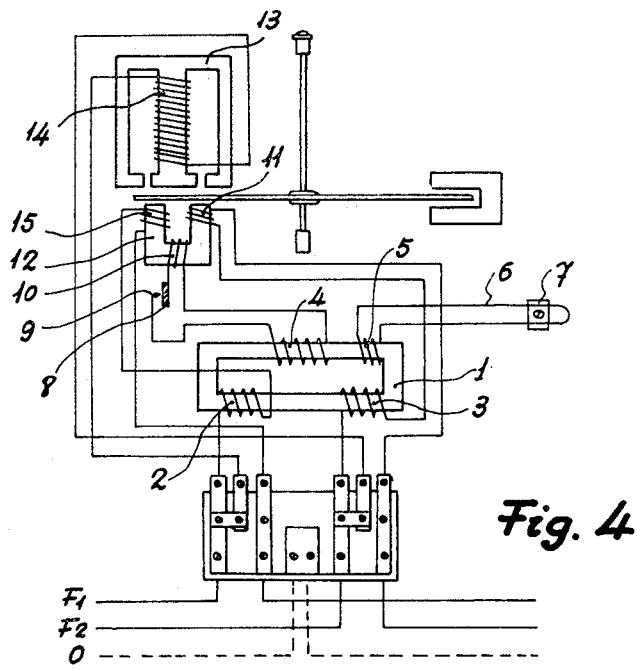
FIG. 4 is a schematic representation of another embodiment of the present invention.
Figure 2:
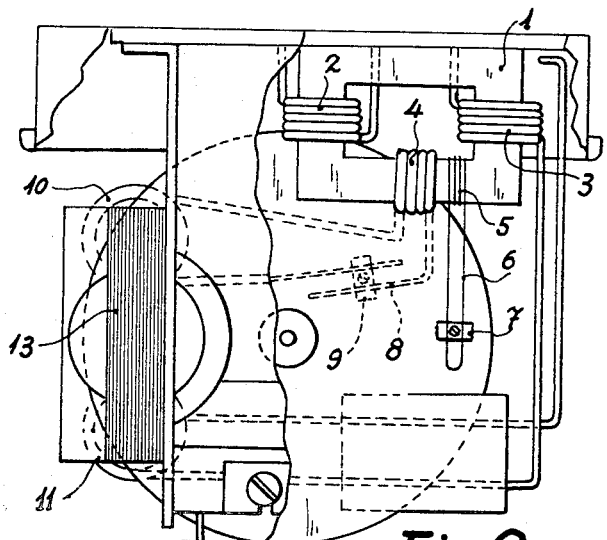
FIG. 2 is an upper view of a meter embodying the circuit of FIG. 1.
Figure 3:
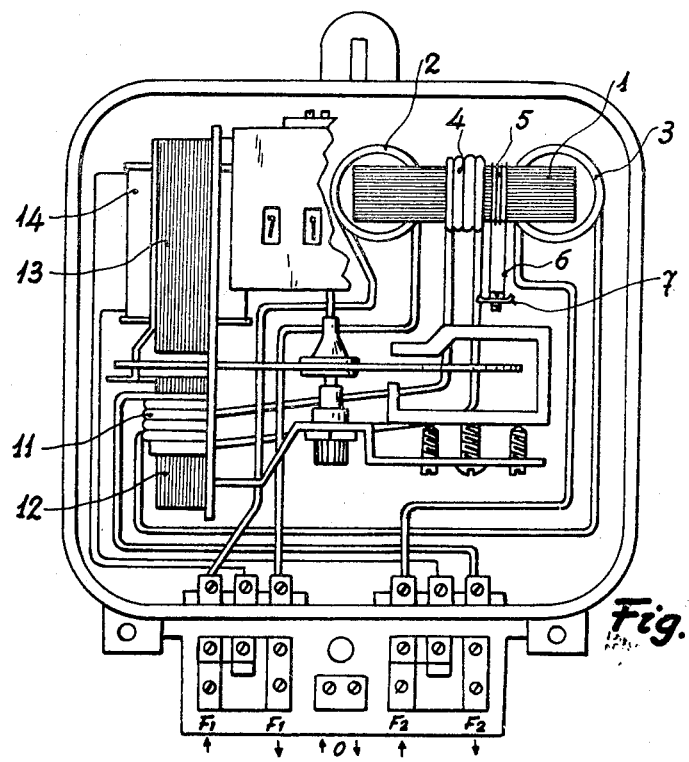
FIG. 3 is a front view of the apparatus of FIG. 2.

The operation of the first variant of the invention, in accordance with FIG. 4, will now be described. As has been already described with reference to FIG. 1 when the current consumption is between the phases $F_1$ and $F_2$, the electromagnetic effect of the primary coil 2 and 3 of ahe ammeter induction equipment is null. When it is a question of measuring the consumption between the phase $F_1$ and $0$, in the ammeter induction equipment there will only operate as a primary the coil 2 inducing a low-voltage current in the coil 4 which, because of its number of turns on being in parallel with the auxiliary coil 10 has a value of $$i_1 = \frac{I_1}{\sqrt{3}}$$

and is out of phase by an angle of 90° with the consumption current $I_1$ (see FIG. 6C where it is seen that this current $i_1$ is 60° out of phase with the compound voltage $\sqrt{3}V$). The effect of this secondary current $i_1$ on circulating through the auxiliary coil 10 fitted on the electro-magnet of the meter will give a complementary torque to the motor unit. Again, the current of $I_1$ will likewise give a motor torque to the meter on this current flowing through the coil 15 of the electro-magnet 12 of the meter; that is to say, that the meter will register the following data at different values of cos:

at cos 0°

$$\tfrac{1}{2}.\sqrt{3}.V.I_1. \cos 30° + \tfrac{1}{2}\sqrt{3}.V.i_1. \cos 60°$$

$$=\tfrac{1}{2}.\sqrt{3}.V.I_1.\tfrac{\sqrt{3}}{1}+\tfrac{1}{2}\sqrt{3}.V.\tfrac{I_1}{\sqrt{3}}\tfrac{1}{2}=V.I_1$$

at cos 30°

$$\tfrac{1}{2}.\sqrt{3}.V.I_1. \cos 0° + \tfrac{1}{2}.\sqrt{3.Vi_1}. \cos 90°$$

$$=\tfrac{\sqrt{3}}{2}.V.I_1+0=0.86.V.I_1$$

at cos 60°

$$\tfrac{1}{2}.\sqrt{3}.V.I_1. \cos 30° - \tfrac{1}{2}.\sqrt{3}.V.i_1. \cos 60°$$

$$=\tfrac{\sqrt{3}}{2}.V.I_1.\tfrac{\sqrt{3}}{2}-\tfrac{\sqrt{3}}{2}.V.\tfrac{I_1}{\sqrt{3}}.\tfrac{1}{2}=0.5.V.I_1$$

at cos 90°

$$\tfrac{1}{2}.\sqrt{3}.V.I_1. \cos 60° - \tfrac{1}{2}.\sqrt{3}.V.i_1. \cos 30°$$

$$=\sqrt{3}.V.I_1.\tfrac{1}{2}-\tfrac{\sqrt{3}}{2}.V.\tfrac{I_1}{\sqrt{3}}.\tfrac{\sqrt{3}}{2}=0$$

that the same effects when the consumption is between the phase $F_2$ and 0, or the sum of consumption between phases and phases and neutral. Consider now the second variant of the invention, indicated at FIG. 5, in accordance with the vectorial diagram of FIG. 6D when the power consumed is between the phase $F_1$ and 0 at cos $\varphi=1$. Since $I_1$ is in phase with $V_1$, its energy consumption will be recorded by the coil 15 of the electro-magnet of the meter, being $V_1 \times I_1$ since the induction equipment does not produce any effect on no current circulating through its primary coil 3 of the phase $F_2$. When the current consumed is $I_2$ between the phase $F_2$ and 0 at cos $\varphi=1$, the ammeter coil 15 of the electro-magnet of the meter will not produce any effect since no current is circulating through this phase $F_1$. However, in the ammeter induction equipment, the primary coil 3 on current $I_2$ of phase $F_2$ passing throughout it, induces in the coil of the secondary 4 a current $i_2$ of the same value as the value of the primary one $I_2$ out of phase from the latter by 120° which, on passing through the auxiliary coil 10 situated on the current electro-magnet of the single-phase meter, the vectorial diagram 6C illustrates that $i_2$ is in phase $V_1$, i.e. that the meter will register the power consumed:

$$V_1 i_2 = V_2 \times I_2$$

As a consequence of all that has been said, when the consumption is between phases $F_1$ and $F_2$ and with cos $\varphi=1$, we see in the vectorial diagram indicated by $I_c$ the consumption current being 30° out of phase with V. This current $I_c$ circulates in a contrary direction through the coil of the primary 3 of the transformer 1, marked in the vectorial diagram by $-I_c$, through which it induces in the coil of the secondary 4 a current out of phase by 120°, which we indicate by $-i_c$, from which we deduce that $-i_c$ is 30° out of phase with $V_1$, that is, that it will supply a supplementary motor torque to the meter of $V_1 \times i_c \times \cos 30° = V_1 \times I_c \times \cos 30°$ which is algebraically added to the motor effect produced by the coil 15 of the electro-magnet of the meter, which is $V_1 \times I_c \times \cos 30°$.

$$V_1 \times I_c \cos 30° + V_1 \times I_c \times \cos 30° = \sqrt{3} \times V_1 \times I_c$$

that is, the real power consumed. The same will happen with different values of cos.

I claim:
1. An alternating-current electric measuring device for use with a two phase electrical signal and which does not require a connection to the neutral comprising:
    a single phase meter including a voltage coil and a consumption current electro-magnet having a consumption current coil and an auxiliary coil wound thereon;
    means coupling the two phases of said electrical signal to said voltage coil of said meter; and
    an ammeter induction device coupled to said single phase meter for producing a magnetizing current complementary to the consumption current electro-magnet of said single phase meter without using voltage sensitive devices, said ammeter induction device including:
        a closed transformer core;
        first and second primary coils having an equal number of turns wound on said core, said first and second primary coils being insulated and independent of each other;
        means coupling said first primary coil in series with a first phase of said signal;
        means connecting said second primary coil in series with the consumption current coil of said meter;
        means further connecting the series combination of said consumption current coil and said second primary coils in series with the second phase of said signal;
        a secondary coil on said core;
        a variable resistance coupled in series with said secondary coil; and
        means coupling said secondary coil and said variable resistance in parallel with said auxiliary coil of said meter, the value of the induced low-voltage current produced by said secondary coil having a value equal to the result of dividing the consumption current which circulates through the primary coils by the square root of three.

2. The meter of claim 1 wherein said secondary coil on said core has the same number of turns as said consumption current coil of said meter.

3. The meter of claim 2 wherein the two primary coils are magnetically positioned on said core such that on the passage of the current consumed by a load device connected between said two phases, the magnetic field is null; and
    further comprising an additional coil wound on said core; and
    a variable resistance coupled in parallel with said additional coil for correcting the out-of-phase angle.

4. The meter of claim 3 wherein the value of the out-of-phase angle of the current produced by the coil of the secondary is 30° with respect to the current of the primary.

5. The meter of claim 2 wherein said single phase meter comprises a single-phase (two-wire) motor having two consumption current coils and an auxiliary coil and wherein:
    said first primary coil is further coupled in series with a first one of said consumption current coils;
    said second primary coil is coupled in series with said second consumption coil and said second phase of said signal;
    the number of turns of said secondary coil being equal to half that of one of said consumption current coils of said motor so that the value of the current induced in said secondary coil has a value equal to the result of dividing the consumption current which circulates through the primary by the square root of three.

6. The meter of claim 2 wherein the out-of-phase angle of the current of the secondary is 90° with respect to the current of the primary, the two coils of the primary being magnetically located on said core such that on the passage of the current consumed by a load device connected between said two phases, the magnetic field is null;

further comprising an additional coil on said core; and an adjustable resistance coupled in parallel with said additional coil for correcting the value of the out-of-phase angle.

7. The meter of claim 2 wherein said current consumption coil has a number of turns equal to those of said auxiliary coil, and further comprising:

a second adjustable resistance; and an additional coil on said core coupled in parallel with said second resistance for correcting the value of the out-of-phase angle.

8. An alternating current electric measuring device for use with at least a two phase electrical signal comprising:

a single phase meter including a voltage coil and a consumption current electro-magnet having a consumption current coil and an auxiliary coil wound thereon;

means coupling said consumption current coil directly in series with a first phase of said signal;

means coupling said voltage coil between the first phase of said signal and neutral; and an ammeter induction device coupled to said single phase meter for producing a magnetizing current complementary to the consumption current electro-magnet of said single phase meter without using voltage sensitive devices, said ammeter induction device including:

a closed transformer core;

a single primary coil having a predetermined number of turns wound on said core;

means connecting said single primary coil in series with the second phase of said electrical signal;

a secondary coil on said core;

a variable resistance coupled in series with said secondary coil;

means coupling said secondary coil and said variable resistance in parallel with said auxiliary coil of said meter;

the turns ratio between the primary coil and the secondary coil being such that the low-voltage current induced in said secondary coil has a magnitude equal to the magnitude of the current which circulates through said primary coil, but out of phase with said primary current by an angle of 120°.

References Cited

UNITED STATES PATENTS 3,155,903  11/1964  Petzinger _____ 324—107

ALFRED E. SMITH, Primary Examiner

U.S. Cl. X.R.

324—142